No. 783,635. Patented February 28, 1905.

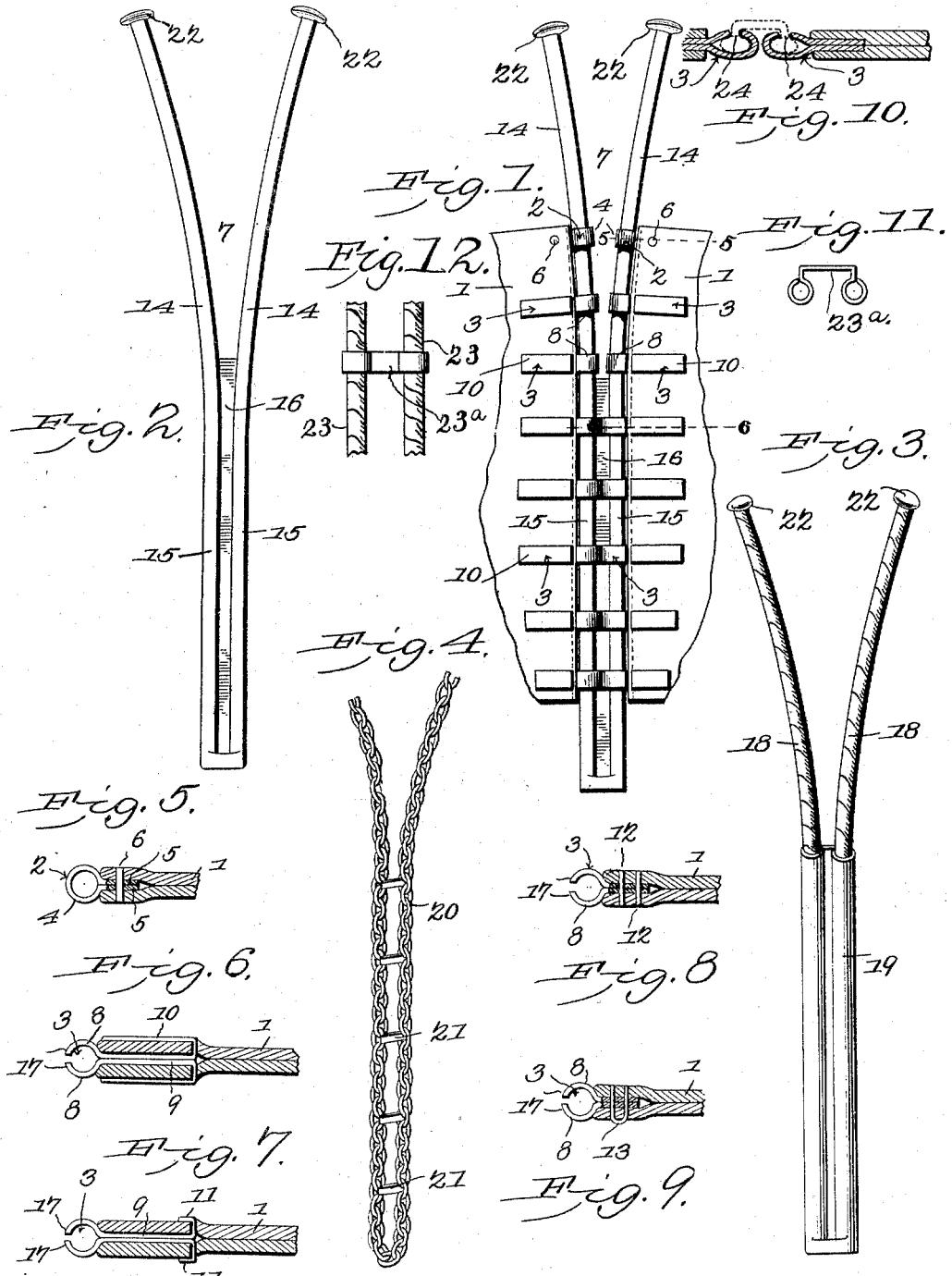

UNITED STATES PATENT OFFICE.

ANDREW J. HARLAN, OF LONDON MILLS, ILLINOIS.

SHOE-FASTENER.

SPECIFICATION forming part of Letters Patent No. 783,635, dated February 28, 1905.

Application filed August 22, 1904. Serial No. 221,784.

*To all whom it may concern:*

Be it known that I, ANDREW J. HARLAN, a citizen of the United States, residing at London Mills, in the county of Fulton and State of Illinois, have invented a new and useful Shoe-Fastener, of which the following is a specification.

This invention relates to shoe-fasteners.

The object of the invention is to dispense with the employment of the ordinary form of shoe-lacing and to employ in lieu thereof a form of fastener which while being thoroughly effective for keeping the flies closed will upon movement in one direction release the flies from top to bottom and upon movement in the opposite direction will positively close and hold the flies against opening; furthermore, to obviate the necessity of tying knots to keep the ends of the lacings connected, thereby in a unique and highly-desirable manner adapting the device for use by one-armed people or by aged people who have great difficulty in stooping over, as is necessary where the ordinary form of lacing is employed.

With the above and other objects in view, as will appear as the nature of the invention is better understood, the same consists in the novel construction and combination of parts of the shoe-fastening, as will be hereinafter fully described and claimed.

In the accompanying drawings, forming a part of this specification, and in which like characters of reference indicate corresponding parts, Figure 1 is a view in front elevation of a portion of a shoe-upper, showing the device of the present invention applied thereto. Fig. 2 is a detached detail view of the form of lacing or fastener shown in Fig. 1. Fig. 3 is a modified view of the lacing. Fig. 4 is a still further modified form of the lacing. Fig. 5 is a horizontal section taken on the line 5 5, Fig. 1. Fig. 6 is a similar view taken on the line 6 6, Fig. 1. Fig. 7 is a sectional view showing a slightly-modified form of lace-guide. Figs. 8, 9, and 10 are similar views of three forms of modified lace-guides. Fig. 11 is a detail view of a modified form of clip. Fig. 12 is a detail view of a portion of a lacing, showing the members thereof held combined by the form of clip shown in Fig. 11.

Referring to the drawings, 1 designates the flies of an ordinary shoe, which may be of the usual or any preferred construction. Combined with the opposed edges of the flies and projecting therefrom is a series of keepers 2 and 3, of which there will be generally but two of the keepers 2 and any desired number of the keepers 3. These keepers are made of any suitable material, preferably of sheet metal, which is possessed of both lightness and strength, thus to obviate, on the one hand, objectionable weight and, on the other hand, to present sufficient resisting qualities to withstand the strains to which they will be subjected in use.

The keeper 2 is provided with a cylindrical eye 4 and with two shank members 5, which are interposed between the layers of the upper and are held therein in any suitable manner, preferably by a rivet or rivets 6. The object for providing the keeper 2 with the cylindrical eye 4 is to furnish a positive guide for the lacing 7 and also to prevent its disconnection therefrom.

Each of the keepers 3 is by preference constructed of two pieces of metal, each formed with a semicircular eye member 8 and with a shank 9, the terminals of the eye members being spaced apart, as shown in Fig. 6, for a purpose that will presently appear. The shanks 9 of each of the keepers 3 are disposed between the layers of the upper and may be held in position therein in several different ways, either of which will be thoroughly effective for the purpose designed. As shown in Fig. 6, the shanks are of sufficient length to be turned over the outer sides of the flies and be clenched thereagainst, as shown at 10; or, as shown in Fig. 7, the shanks may be of a sufficient length to permit only a short portion of their length to be turned over and clenched against the flies, as shown at 11; or, as shown in Fig. 8, the shanks may extend only a short distance between the flies and be held therein through the medium of rivets 12 or by a staple or by staples 13, as shown in Fig. 9.

The lacing 7, which constitutes one of the essential features of the invention, may be constructed of any suitable material, such as leather, round metal chains, or a strip of rubber cloth with a string fastened on each edge, or of any other preferred material. The lacing comprises two members 14, which are separated through a portion of their length, but are connected from a point approximately intermediate of its length to its lower end. In the form shown in Fig. 1 the lacing is made of a single piece of leather, the members 14 of which are rounded and the lower portion 15 of which is provided on each side with a groove 16, which grooves aline and are adapted to be engaged by the inturned terminals 17 of the eye members 8, these grooves serving to permit the eye-terminals to embrace a sufficient portion of the solid or connected part of the lacing to hold the flies against being opened. Instead of making the lacing of a single piece of leather two pieces of leather or string 18 may be employed, as shown in Fig. 3, and these may be connected by a sheathing 19 or other assembling device, which will permit the connected portion to pass through the keepers.

In the form of embodiment shown in Fig. 4 the lacing consists of a piece of chain 20, bent upon itself and held together at intervals by clips 21, which may be combined with the chain in any preferred manner.

In order to limit the downward movement of the lacing, the upper free terminals thereof may be provided with suitable stops 22, or the upper or separated portions of the lacing may have a suitable ornament which will shield the parts and enhance the beauty of the shoe; but, if preferred, a stop may be provided by tying a knot at the end of each lacing.

While it will generally be preferred to form the upper keepers 2 with a continuous cylindrical eye 4, as shown, it will of course be apparent that, if preferred, the keeper may be split in the same manner as the keepers 3, and as this will be well understood detailed description thereof is deemed unnecessary.

Instead of employing the sheath 19 for holding the strings assembled, which sheath may be of rubber, the strings 23 may be connected at intervals by metallic clips 23ª, as shown in detail in Fig. 12.

Instead of having the openings in the keepers 3 at the side thereof they may be disposed in the top, as shown at 24 in Fig. 10.

In the use of the device the members 14 of the lacing are passed through the keepers 3 and 2, and the stop 22 or its equivalent is then connected therewith. So long as the connected portion 15 of the lacing is in engagement with the keepers 2 and 3 the flies will be held connected; but when it is desired to release the flies when the shoe is to be removed the lower end of the lacing is grasped and pulled down until the connected portion passes the lowest of the keepers 3, whereupon the flies may be readily opened. To reassemble the flies, it will only be necessary to draw upward upon members 14.

It will be seen from the foregoing description that although the shoe-fastening of this invention is exceedingly simple of construction it will be found of the highest efficiency and durability in use and will in a practical manner secure the functions designed.

Having thus described the invention, what I claim is—

1. In a shoe, the combination with the opposed edges of its flies, of a plurality of split keepers having shanks secured between the layers of the flies, a bifurcated lacing engaging the keepers, and means for limiting the movement of the lacing in both directions.

2. In a shoe, the combination with the opposed edges of its fly, of a plurality of split keepers having shanks secured between the fly layers, and a bifurcated lacing engaging the keepers and having its lower portion provided with grooves to be engaged by the opposed terminals of the keepers.

3. In a shoe, the combination with the opposed edges of its fly, of a plurality of split keepers having shanks secured between the layers of the flies, and a bifurcated lacing engaging the keepers.

4. In a shoe, the combination with the opposed edges of its flies, of a plurality of split keepers having shanks secured between the layers of the flies, the terminals of the shanks being projected through the flies to the outer sides thereof and clenched, and a bifurcated lacing engaging the keepers.

In testimony that I claim the foregoing as my own I have hereto affixed my signature in the presence of two witnesses.

ANDREW J. HARLAN.

Witnesses:
 W. W. VOSE,
 GUSTEN HARLAN.